No. 615,246. Patented Dec. 6, 1898.
O. T. BUGG, Jr.
ELECTRIC BATTERY.
(Application filed Mar. 15, 1898.)
(No Model.)
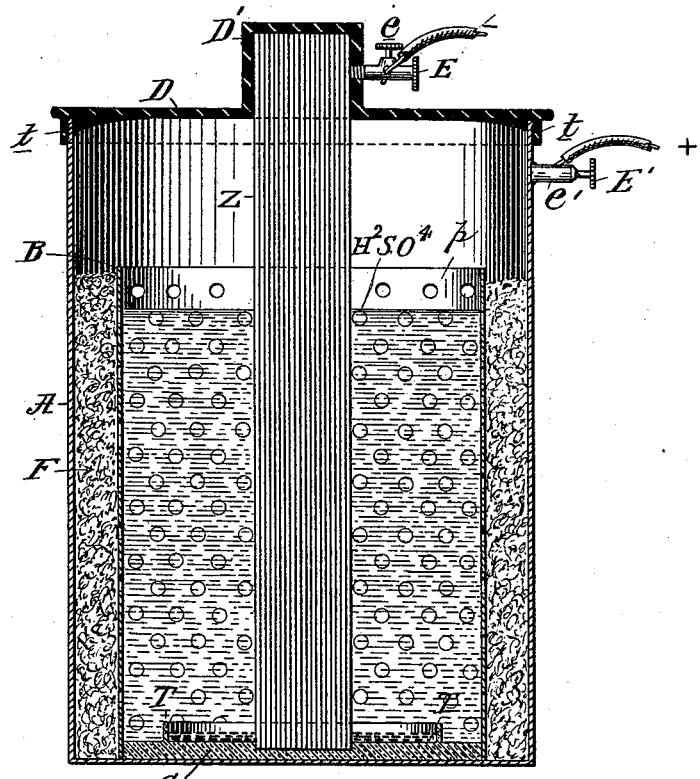
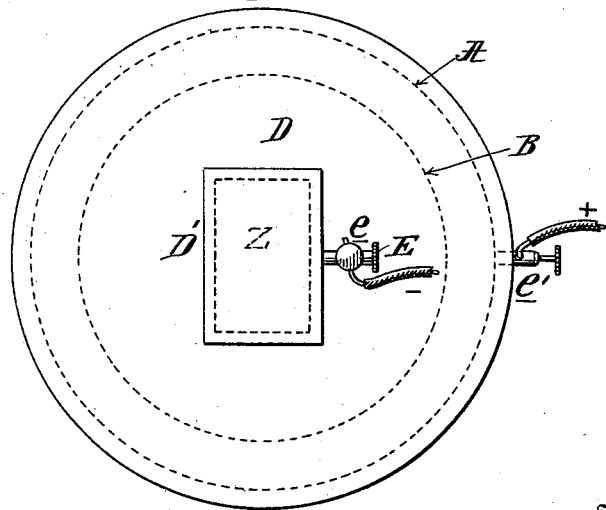

UNITED STATES PATENT OFFICE.

OWEN T. BUGG, JR., OF NEW YORK, N. Y.

ELECTRIC BATTERY.

SPECIFICATION forming part of Letters Patent No. 615,246, dated December 6, 1898.

Application filed March 15, 1898. Serial No. 673,908. (No model.)

*To all whom it may concern:*

Be it known that I, OWEN T. BUGG, Jr., a citizen of the United States, residing at New York, in the county of New York and State of New York, have made a new and useful Invention in Electric Batteries, of which the following is a specification.

My invention has for its objects, first, to devise an electric battery in which the several parts thereof shall be as compactly held together as possible, so that it may be transported from place to place or subjected to reasonably rough usage without danger of injury thereto; second, to provide means whereby short-circuiting will be avoided in the event of depositing of metallic particles upon the bottom of the cell when such particles are disintegrated or broken away from the zinc electrode thereof.

My invention will be fully understood by referring to the accompanying drawings, in which—

Figure 1 illustrates a sectional view of a single cell of my novel battery, the binding-posts of the battery being shown in elevational view; and Fig. 2 is a plan view thereof as seen looking at Fig. 1 from the top toward the bottom of the drawings.

Referring now to the drawings in detail for a full and clear understanding of my invention, such as will enable others skilled in the art to construct and use the same, A represents a containing vessel, made, preferably, of lead and constituting one electrode of the battery, to which is attached near the upper surface one of the binding-posts E', e' being the shank thereof. D is a lid or cover therefor, constructed, preferably, of hard rubber or equivalent insulating material, said lid being screw-threaded at its under side in such manner as to secure it to corresponding screw-threads t at the top of the vessel A. In the center of the lid is an upwardly-extending chamber D', of rectangular form, to one side of which is secured by screw-threads a binding-post E, having a screw e, adapted to secure one of the conductors to the positive electrode of the battery.

Z is the zinc electrode of the battery, and is composed of a number of thin sheets of zinc of rectangular form, laid side by side, there being a sufficient number of such sheets to fit loosely within the rectangular upward extension D'.

B is a cylinder of somewhat smaller diameter than the inner diameter of the vessel A, and is constructed, preferably, of lead and has numerous perforations $p\ p$ for affording a free circulation of the excitant liquid therethrough. F is a packing, preferably of flaky lead, and is designed to constitute, together with the interior cylinder B and the retaining vessel A, the oxidizable electrode of the battery.

C is a disk of glass, porcelain, or equivalent insulating material, provided with an upwardly-extending cup T and a downwardly-extending rectangular opening adapted to receive the lower ends of the zincs Z, said disk C fitting loosely within the lower end of the lead cylinder B.

The parts are assembled as follows: The lead cylinder B is inserted within the retaining vessel and the flaky lead F packed securely around it, after which the disk C is lowered into position at the bottom of the vessel. The amalgamated zincs Z are now inserted with their lower ends in the rectangular opening of the disk C. The excitant liquid, such as diluted sulfuric acid or any well-known equivalent liquid, is now poured into the vessel until the same reaches substantially to the top of the cylinder B. The lid D is now put in position, with the upper ends of the zincs Z extending upward into the chamber D', and said lid is rotated from left to right until it is firmly secured by the screw-threads $t$ to the top of the containing vessel A, the zincs Z in the meantime rotating the disk C and simultaneously moving upward into the position shown in Fig. 1. The binding-post E is now firmly secured within the wall of the upwardly-extending chamber D' in such manner as to firmly bind the zincs together and make at the same time a good electrical contact with them. The battery is now ready for use. After the battery has become polarized it may be restored to its normal condition by connecting the poles thereof to a dynamo-electric machine in the usual manner and recharging it in the same manner that well-known zinc-lead batteries are revived. The zincs Z are of course thoroughly amalgamated in the well-known manner, and, if preferred, a sufficient quantity of mercury to keep up the amalgamation may be placed within the retaining-cup T.

Should any particles of metallic zinc become disintegrated or detached from the zinc electrode, they will fall within the cup T and be prevented thereby from coming into contact with the inner wall of the lead cylinder B, thus avoiding a short circuit.

This structure of battery, owing to the manner in which it is mechanically bound together, makes it a very desirable cell for use in connection with movable vehicles or wherever it is desired to transport it from place to place, it being apparent that the electrodes will always maintain their relative positions, owing to the manner in which they are bound together.

Having thus described my invention, what I claim, and desire to secure by Letters Patent of the United States, is—

1. An electrical battery having a containing vessel of conducting material, in combination with a perforated interior cylinder also of conducting material and a mass of active material, such as flaky lead, packed between the inner wall of said vessel and the cylinder, together with a zinc electrode rigidly secured to the cover of the vessel, which latter is constructed of insulating material, substantially as described.

2. An electrical battery consisting of a conducting containing vessel provided with an insulating-cover to which is rigidly secured a downwardly-extending electrode, in combination with a perforated interior conducting-cylinder and an active material between said cylinder and the containing vessel, together with a disk of cup-like form located in the bottom of the vessel and provided with means for positively securing the lower end of the downwardly-extending electrode, substantially as described.

3. An electrical battery consisting of a conducting containing vessel having a non-conducting cover to which is rigidly secured the zinc electrode, in combination with an inclosed cylinder and active material packed between said cylinder and the inner wall of the containing vessel, together with means at the bottom of the vessel for securing the zinc electrode, substantially as described.

4. An electrical battery consisting of a lead containing vessel, an inclosed perforated cylinder also of lead, active material, such as flaky lead, packed between said perforated cylinder and the inner wall of the containing vessel, the same constituting one electrode of the battery, in combination with an electrode of opposite polarity consisting of a series of sheets of metal, properly amalgamated and rigidly secured at their upper ends to a non-conducting lid or cover, together with means located at the bottom of the vessel for rigidly securing said electrode in a vertical position, and an excitant liquid, such as sulfuric acid, substantially as described.

5. An electrical battery consisting of a lead containing vessel A, a perforated cylindrical inner vessel B, active material F located between the perforated cylinder and the inner wall of the containing vessel; a non-conducting cover D having an upwardly-extending chamber D'; a zinc electrode Z consisting of a series of thin plates properly amalgamated and held in position by a binding-post E; a non-conducting disk C located at the bottom of the vessel and provided with means for securing the lower ends of the zincs Z, and additional means in the nature of a cup T for preventing a short circuit upon disintegration of the zinc electrode Z, substantially as described.

In testimony whereof I have hereunto subscribed my name this 12th day of March, 1898.

OWEN T. BUGG, JR.

Witnesses:
CHARLES J. KINTNER,
EDWARD C. ROWLAND.